United States Patent [19]

Asai et al.

[11] 4,136,157

[45] Jan. 23, 1979

[54] METHOD OF PREPARING PURIFIED SILVER NITRATE

[75] Inventors: Tomiyasu Asai; Akira Endo, both of Odawara, Japan

[73] Assignee: Fuji Photo Film Co., Ltd., Minami-ashigara, Japan

[21] Appl. No.: 814,580

[22] Filed: Jul. 11, 1977

[30] Foreign Application Priority Data

Jul. 9, 1976 [JP] Japan ................................. 51-82324

[51] Int. Cl.$^2$ .......................... C01B 21/48; C01G 5/00
[52] U.S. Cl. ....................................... 423/395; 423/43; 75/109; 204/109
[58] Field of Search .......................... 423/25, 43, 395; 204/46 R, 109; 210/52, 53; 75/109, 118 P

[56] References Cited

U.S. PATENT DOCUMENTS

| | | | |
|---|---|---|---|
| 1,963,893 | 6/1934 | Drouilly | 75/109 |
| 2,543,792 | 3/1951 | Marasco et al. | 423/25 |
| 2,614,029 | 10/1952 | Moede | 423/43 X |
| 3,141,731 | 7/1964 | Dietz | 423/395 |
| 3,554,883 | 1/1971 | Green | 423/395 X |

*Primary Examiner*—G. O. Peters
*Attorney, Agent, or Firm*—Sughrue, Rothwell, Mion, Zinn and Macpeak

[57] ABSTRACT

A method of preparing silver nitrate of an improved purity comprising adding about 50 to about 1000 ppm of $Al^{3+}$ ion to a crude silver nitrate solution resulting from dissolving metallic silver in nitric acid, adjusting the pH of the silver nitrate solution to about 5.5 to about 6.5 by adding silver oxide thereto, and then separating the precipitate formed.

18 Claims, No Drawings

METHOD OF PREPARING PURIFIED SILVER NITRATE

BACKGROUND OF THE INVENTION

1. Field of the Invention

This invention relates to a method of preparing purified silver nitrate, and, more particularly, to a method of removing metal impurities involved in a crude silver nitrate solution in the production of silver nitrate of high purity.

2. Description of the Prior Art

Silver nitrate has been produced heretofore by dissolving metallic silver in nitric acid upon heating. Crude silver nitrate thus produced, however, still contains impurities such as Fe, Cu, Pd, Pb, Ni, Au, Al, Zn, Bi, Hg, Cd, Cr, etc., which must be removed by further purification where a higher degree of purity is required such as in the production of photographic materials, for catalytic use, or for analytical purposes.

To meet such a requirement, various methods have been proposed as for effective removal of metallic contaminants from the crude silver nitrate solution.

One of those methods comprises passing the crude silver nitrate solution through a column filled with activated alumina ($Al_2O_3$) or activated magnesia to eliminate metallic impurities (e.g., as disclosed in U.S. Pat. No. 2,614,029, British Pat. No. 629,179, etc.). This method, however, has the drawback that, when the pH of the solution is too low, the alumina in the column dissolves out and contaminates the crude silver nitrate solution even further.

Another method of contaminant removal, which is based on the fact that acetylene or methylacetylene does not react with divalent metals, comprises bubbling gaseous acetylene or methylacetylene into the crude silver nitrate solution to cause a selective reaction with silver, and then separating the $Ag_2C_2$ or $AgC_2CH_3$ thus formed whereby the contaminants remain in the solution (e.g., as disclosed in U.S. Pat. No. 3,800,030). In this method, the entire quantity of silver must be reacted with acetylene or methylacetylene and converted into $Ag_2C_2$ or $AgC_2CH_3$, which is then again decomposed by nitric acid to obtain purified silver nitrate. Therefore, the procedures are complicated, demanding almost twice as much nitric acid as other methods. The resulting high manufacturing cost makes this method unapplicable industrially. Moreover, the method has another drawback of high hazards due to the unstable nature of $Ag_2C_2$ or $AgC_2CH_3$ which explosively decomposes upon heating, friction, or even by the action of light.

Still another purification process is known wherein the crude silver nitrate solution is rendered nearly neutral by the addition of silver oxide to separate metallic impurities as hydroxides which have low solubilities. The hydroxides thus formed can be removed by filtration. Although this process can be practiced easily, and is employed widely, limitations exist on the kinds of metallic impurities which can be removed by this process. For example, Ni, Zn, Pb, Cd, Hg, etc., cannot be removed to a satisfactory extent using this process.

To obviate such an undesirable selectivity, an improved method has been proposed wherein iron compounds such as $Fe(NO_3)_3$, $Fe(OH)_3$ or iron powder are added in order to increase the impurity removal efficiency (e.g., as disclosed in U.S. Pat. No. 3,141,731, British Pat. No. 1,042,159, etc.). Even in this modified process, Ni, Zn or Cd cannot be removed to a satisfactory extent. Moreover, on filtering the separated precipitate, ferric hydroxide not only tends to clog the filter membrane, making filtration quite difficult, but also a long time is required to dissolve ferric hydroxide due to the poor solubility of ferric hydroxide in nitric acid. Furthermore, the ferric compound added has a high possibility of contaminating the silver nitrate, which has been demonstrated by the fact that, when the resulting silver nitrate is used for the production of a photographic material, a spot-like fog occurs on the photographic material.

SUMMARY OF THE INVENTION

One object of the present invention is to provide a method of preparing silver nitrate of extremely high purity which can be used without concern in photographic, catalytic and analytical purposes.

Another object of the present invention is to provide a method of producing silver nitrate with high purity and free of metallic impurities.

Still another object of the present invention is to provide a method of producing silver nitrate of extremely high purity, which method comprises simple operations with an economical manufacturing cost.

Still another object of the present invention is to provide a method of producing silver nitrate with high purity suitable for photographic purposes.

It has now been found after extensive studies that these and other objects of the invention are accomplished by the process of this invention which comprises adding to a crude silver nitrate solution resulting from dissolving of metallic silver in nitric acid from about 50 to about 1000 ppm of aluminum ion ($Al^{3+}$) in the form of $Al(NO_3)_3$, $Al(OH)_3$, or elemental aluminum based on the amount of silver nitrate, adjusting the pH of the solution to from about 5.5 to about 6.5 by adding silver oxide to the solution so as to form a precipitate, and then separating the precipitate e.g., by filtration or decantation, etc., from the solution, whereby metallic impurities, such as Fe, Cu, Pd, Ni, Au, Zn, Bi, Hg, Cr, Cd, etc., are quite effectively removed.

DETAILED DESCRIPTION OF THE INVENTION

The metallic silver which can be used can be that having a purity of 99.9% or more and the crude silver nitrate solution can be prepared therefrom using $HNO_3$ which can have a purity as described in JIS K-1308. Since highly pure silver nitrate solutions are desired in photographic applications, it is, therefore, preferred for the nitric acid and metallic silver starting materials used to prepare the crude silver nitrate solution to which this invention is applicable to have initially as high a purity as possible. However, the above description of the metallic silver and $HNO_3$ starting materials which can be used is merely exemplary and should not be construed as limiting the present invention. This is particularly true since the process of this invention can be repeated (one or more times) to decrease and remove impurities present in the silver nitrate solution. The method of this invention is also applicable to a crude silver nitrate solution to which silver oxide has been added (one or more times) to precipitate metal impurities as hydroxides with low solubilities and the metal hydroxide precipitates removed e.g., by decantation of filtration, as described hereinabove.

A suitable range for the amount of $Al^{3+}$ added, as $Al(NO_3)_3$, $Al(OH)_3$ and elemental aluminum (preferably in a finely divided form), to the crude silver nitrate solution is from about 50 to about 1000 ppm, more preferably from 50 to 400 ppm, and most preferably from 100 to 200 ppm, based on the silver nitrate present.

The silver nitrate solution is desirably heated after the addition of the $Al^{3+}$. Although the reaction rate advantageously increases as the solution temperature is increased, the preferred range of temperature is from about 50° to about 90° C. considering the hazards attendant to operation at high temperatures.

Although a pH closer to neutrality is more effective after the pH has been adjusted by the addition of silver oxide, a larger amount of silver oxide is required, which increases the manufacturing cost to a very large extent. Therefore, a pH of from about 5.5 to about 6.5 is appropriate, and from 6.0 to 6.2 is more preferred.

As described above, the material providing the aluminum ion can be added to the crude silver nitrate solution at any temperature and generally room temperature (about 20°-30° C.) or higher. Desirably the $Al^{3+}$ is added to the solution and then the solution is heated to preferably about 50° to about 90° C., more preferably 60° to 70° C. The silver oxide can also be added at any temperature, generally at room temperature or above. Heating to preferably about 50° to about 90° C., more preferably 60° to 75° C. is also suitable after the silver oxide addition. While these temperatures can be used for the $Al^{3+}$ ion addition and pH adjustment steps, cooler temperatures are preferred for the filtration step since the filtration is enhanced. Heating of the solution after adddition is merely preferred but not essential. Heating before addition can also be employed.

The method of the present invention is generally superior to the method based on the use of $Fe^{3+}$ for the removal of metallic impurities in terms of impurity elimination efficiency, and particularly from the standpoint of the elimination of Ni and Zn.

Further, according to the method of the present invention, separation of the precipitate formed by filtration can be carried out quite smoothly with little tendency toward clogging of the filtering means used.

The method of the present invention only requires that predetermined amounts of $Al^{3+}$ and silver oxide be added to the crude silver nitrate solution, and does not require than an additional apparatus such as alumina column be used. Hence, the present method can be practiced economically with a simple and inexpensive apparatus which can be safely maintained.

The addition of the $Al^{3+}$ ion and the silver oxide to adjust the pH as described above can be conducted simultaneously or in a sequential manner. Further the addition of the $Al^{3+}$ and the silver oxide to the silver nitrate solution can be repeated, if desired, at least one additional time to further improve the purity of the ultimate silver nitrate solution obtained.

Further, as will be apparent from the description given hereinbefore the crude silver nitrate solution subjected to the method of the present invention can be one prepared by dissolving silver metal in nitric acid and one which is further subjected to a preliminary, purification process, e.g., a silver nitrate solution obtained by addition of silver oxide thereto, one or more times, to initially precipitate metal hydroxides with these metal hydroxide precipitates being removed from the crude silver nitrate prior to subjecting such to the method of this invention.

Moreover, an advantage exists in the present method when the method is employed in the production of silver nitrate for photographic use. More specifically, if too large an amount of $Al^{3+}$ is added by accident, the extent and possibility of spoiling the final photographic product is far less than in the case where an excess amount of Fe were used since aluminum is less active photographically than iron.

Another advantage of the present method is that it can reduce the number of subsequent crystallization operations employed. In many conventional purification methods, the degree of purity has been usually increased by crystallization twice. On the contrary, in the method of the present invention a single crystallization suffices, and in certain instances, one can eliminate such a crystallization completely, which makes the present method quite economical.

Some specific examples are described below in order to demonstrate the effects and advantages of the present invention. All percentages, ratios and parts given in the following examples are all by weight, unless otherwise indicated.

EXAMPLE 1

A 3 liter crude silver nitrate solution containing the components shown in Table 1 below was prepared by intentionally adding metallic impurities to a solution resulting from dissolving metallic silver in nitric acid.

One liter of the 60% crude silver nitrate solution thus prepared was placed in a beaker (I), to which was added 30 g silver oxide to adjust the pH of the solution to 6.1 under heating to 70° C. on a steam bath. After agitation for 48 hours with agitating blades, the heating was stopped and the solution was allowed to stand for 24 hours. Then, the precipitate was removed by filtration, thus providing the purified silver nitrate solution designated Sample No. 1 which had the composition as shown in Table 1.

Next, in another beaker (II) was poured another one liter of the above-described 60% crude silver nitrate solution, to which $Fe(NO_3)_3$ was added so that the amount of $Fe^{3+}$ was 200 ppm relative to the silver nitrate. Then, as the solution was kept at 70° C. on a steam bath, 30 g of silver oxide was added to adjust the pH of the solution to 6.1. After the solution was kept at the same temperature for 2 hours under agitation with agitating blades, the solution was allowed to stand for 24 hours. Then by filtering the precipitate, a silver nitrate solution designated Sample No. 2 with the composition shown in Table 1 was obtained.

The remaining one liter of the above described 60% crude silver nitrate solution was placed in a beaker (III), to which was added $Al(NO_3)_3$ in such a quantity that the $Al^{3+}$ amounted to 150 ppm relative to the silver nitrate. While heating the solution on a steam bath to keep the temperature at 70° C., the pH of the solution was adjusted to 6.1 by adding 30 g of silver oxide. After the solution was kept at the same temperature for 2 hours under agitation with agitating blades, the solution was allowed to stand for 24 hours without heating. Then by filtering the precipitate, the silver nitrate solution designated Sample No. 3 having the composition shown in Table 1 was obtained.

Table 1

| | Crude AgNO$_3$ Solution | Sample No. 1 | Sample No. 2 | Sample No. 3 |
|---|---|---|---|---|
| pH | 2.7 | 6.1 | 6.1 | 6.1 |
| Fe | 15 ppm | 1 ppm | 3 ppm | — |
| Cu | 37 | 1 | 0.5 | — |
| Ni | 20 | 17 | 12 | 1 ppm |

Table 1-continued

| | Crude AgNO₃ Solution | Sample No. 1 | Sample No. 2 | Sample No. 3 |
|---|---|---|---|---|
| Zn | 18 | 8 | 5 | 2 |
| Pb | 15 | 9 | 2 | 1.5 |
| Cd | 14 | 10 | 8 | 0.5 |
| Al | 24 | 2.5 | 2.5 | 3 |
| Pd | 21 | 1.5 | 1.5 | 0.5 |
| Au | 1 | 0.1 | — | — |
| Bi | 25 | 3 | 1 | 0.5 |
| Hg | 0.5 | 0.45 | 0.3 | 0.2 |
| Cr | 16 | 0.8 | 0.5 | 0.1 |

All ppm's in the above table were calculated on the basis of the silver nitrate. Where no value is given, the species was undetectable because of the concentration was too low to detect.

According to the results shown in Table 1, Sample No. 3 prepared in accordance with the present invention had a higher level of purity for almost all kinds of metallic impurities, showing the superior impurity elimination efficiency of the present method compared with the other two methods employed to prepare Samples Nos. 1 and 2. The superiority of Sample No. 3 is remarkable for Ni and Zn in particular.

EXAMPLE 2

By dissolving metallic silver in nitric acid, and then adding metallic impurities to the solution, one liter of a crude silver nitrate solution with the composition shown in Table 2 below was prepared.

The total amount of the 50% crude silver nitrate solution thus prepared in a 1 liter beaker (IV), and the beaker was placed on a steam bath to heat the solution to 60° C. Then 30 g of silver oxide was added to the solution to adjust the pH to 6.1. After agitation for one hour with agitating blades, the solution was allowed to cool. After 12 hours the precipitate had settled at the bottom of the vessel, and the supernatant liquid was decanted off into two 500 ml beakers (V) and (VI) in equal volumes.

Then, while heating the 500 ml in beaker (V) to 60° C. on a steam bath, $Fe(NO_3)_3$ was added to the solution in such a manner that the $Fe^{3+}$ amount was 200 ppm relative to the silver nitrate, and further 15 g of silver oxide was added thereto to adjust the pH to 6.2. After agitation for one hour at the same temperature, heating was stopped and the beaker was allowed to cool. Filtration of the precipitate after 24 hours gave a purified silver nitrate solution having the composition designated "Sample No. 4" in Table 2.

Separately, the other 500 ml in beaker (VI) was treated in a similar manner. More specifically, while heating the solution to 60° C. on a steam bath, $Al(NO_3)_3$ was added to the solution in such a manner that the $Al^{3+}$ amounted to 200 ppm relative to the silver nitrate, and further 15 g of silver oxide was added thereto to adjust the pH to 6.2. After agitation for one hour at the same temperature, heating was stopped and the beaker was allowed to cool. Filtration of the precipitate formed after standing for 24 hours gave a purified silver nitrate solution of the composition designated "Sample No. 5" in Table 2.

Table 2

| | Crude AgNO₃ Solution | Sample No. 4 | Sample No. 5 |
|---|---|---|---|
| pH | 1.0 | 6.2 | 6.2 |
| Fe | 48 ppm | 6 ppm | — |
| Cu | 40 | 0.5 | — |
| Ni | 32 | 12 | 0.5 ppm |
| Zn | 44 | 15 | 3 |
| Pb | 19 | 2 | 2 |
| Cd | 21 | 5 | 1.5 |
| Al | 14 | 2 | 5 |
| Pd | 23 | 0.3 | — |
| Au | 1 | 0.05 | — |
| Bi | 8 | 0.1 | — |
| Hg | 0.5 | 0.25 | 0.2 |
| Cr | 26 | 0.5 | 0.1 |

In Table 2, the ppm's were calculated on the basis of silver nitrate. Where no value is shown the species was undetectable because of the concentration was too low to be detected.

According to the results in Table 2, Sample No. 5 prepared in accordance with the present invention had a higher degree of purity for almost every species of metallic impurities, showing the superior impurity elimination efficiency of the method of the present invention in comparison with the method employed to prepare Sample No. 4. The superiority of the present invention is particularly noticeable for elimination of Ni and Zn impurities.

EXAMPLE 3

One liter of a contaminated silver nitrate solution having the composition shown in Table 3 below was prepared by dissolving silver metal in nitric acid.

All of this 50% crude silver nitrate solution was placed in a one liter beaker (VII), to which $Al(OH)_3$ was added in such an amount that the $Al^{3+}$ was 400 ppm relative to the silver nitrate present. Then, the pH of the solution was adjusted to 5.8 by adding 20 g of silver oxide. After agitation for 3 hours with stirring blades, the solution was allowed to stand for 24 hours. Then separation of the precipitate by filtration was carried out, giving the purified silver nitrate solution containing impurities designated "Sample No. 6" in Table 3 below.

Table 3

| | Crude AgNO₃ Solution | Sample No. 6 |
|---|---|---|
| pH | 2 | 5.8 |
| Fe | 10 ppm | — |
| Cu | 31 | — |
| Ni | 3 | — |
| Zn | 5 | — |
| Pb | 1 | — |
| Cd | 2 | — |
| Al | 20 | 3 ppm |
| Pd | 8 | — |
| Au | 1 | — |
| Bi | 2 | — |
| Hg | 0.05 | — |
| Cr | 1 | — |

In Table 3, all ppm's are based on the silver nitrate. Where no value is given the species concerned was present in too small an amount to be detected.

Table 3 demonstrates that the metallic contaminations were satisfactorily removed from Sample No. 6 treated in accordance with the present invention, and moreover that Sample No. 6 could be used without concern as a raw material for photographic products without any further recrystallization procedure.

EXAMPLE 4

A three liter silver nitrate solution was prepared containing impurities shown in Table 4 below by dissolving metallic silver in nitric acid.

The 40% crude silver nitrate solution thus prepared was divided into three equal volumes, each of which was placed in three 1 liter beakers (VIII), (IX) and (X), respectively. To each of these beakers which was warmed to 90° C. on a steam bath was added $Al(NO_3)_3$ in such a manner that the $Al^{3+}$ amounted to 50, 200 and 1000 ppm based on the amount of silver nitrate present, respectively. Then the pH was adjusted to 6.1 by the addition of 35 g of silver oxide. Heating was continued for 2 hours with agitation with stirring blades, and then each solution was allowed to cool for 24 hours. Then the supernatant liquid was separated by decantation and to give the purified silver nitrate solutions, which were analyzed, designated as Samples Nos. 7, 8 and 9, respectively.

Table 4

|  | Crude AgNO$_3$ Solution | Sample No. 7 | Sample No. 8 | Sample No. 9 |
|---|---|---|---|---|
| pH | 2.0 | 6.1 | 6.1 | 6.1 |
| Fe | 10 ppm | 0.1 ppm | — | — |
| Cu | 31 | — | — | 0.1 ppm |
| Ni | 3 | 0.2 | 0.1 ppm | 0.1 |
| Zn | 5 | 0.06 | — | — |
| Pb | 1 | — | — | 0.1 |
| Cd | 2 | — | — | — |
| Al | 20 | 2 | 3 | 5 |
| Pd | 8 | — | — | — |
| Au | 1 | — | — | — |
| Bi | 2 | — | — | — |
| Hg | 0.05 | — | — | — |
| Cr | 1 | — | — | — |

In Table 4, the ppm's are based on the amount of silver nitrate present.

Where no value is given the species concerned was present in too small an amount to be detected.

In accordance with the results in Table 4, the three Samples Nos. 7 to 9, all of which were purified by the method of the present invention, had satisfactorily high degrees of purity with respect to all metallic impurities. These solutions could also be used without concern for photographic purposes without any further recrystallization. In particular, Sample No. 8 exhibited a remarkable suitability therefor.

While the invention has been described in detail and with reference to specific embodiments thereof, it will be apparent to one skilled in the art that various changes and modifications can be made therein without departing from the spirit and scope thereof.

What is claimed is:

1. In a method of manufacturing silver nitrate by dissolving metallic silver in nitric acid and removing metal impurities therefrom, the improvement which comprises adding $Al^{+3}$ ion to a crude silver nitrate solution prepared by dissolving silver metal in nitric acid such that the amount of $Al^{+3}$ added ranges from about 50 to about 1000 ppm based on the weight of the silver nitrate present and, silver oxide to adjust the pH of the solution to about 5.5 to about 6.5, whereby a precipitate of said impurities is formed, and then removing the precipitate formed from the silver nitrate solution.

2. The method of claim 1, wherein said $Al^{3+}$ added arises from the addition of $Al(NO_3)_3$, $Al(OH)_3$ or metallic aluminum.

3. The method of claim 1, including heating said crude silver nitrate solution while adding said $Al^{3+}$ ion to said crude silver nitrate solution.

4. The method of claim 3, wherein said heating is to a temperature of about 50° to about 90° C.

5. The method of claim 1, wherein said addition of silver oxide is to adjust the pH of said solution to 6.0 to 6.2.

6. The method of claim 2, wherein said addition of silver oxide is to adjust the pH of said solution to 6.0 to 6.2.

7. The method of claim 1, wherein the amount of $Al^{3+}$ added ranges from 50 to 400 ppm based on the weight of the silver nitrate present.

8. The method of claim 2, wherein the amount of $Al^{3+}$ added ranges from 50 to 400 ppm based on the weight of the silver nitrate present.

9. The method of claim 7, wherein said addition of silver oxide is to adjust the pH of said solution of 6.0 to 6.2.

10. The method of claim 8, wherein said addition of silver oxide is to adjust the pH of said solution to 6.0 to 6.2.

11. The method of claim 1, wherein said method comprises simultaneously adding said $Al^{3+}$ ion and said silver oxide to the crude silver nitrate solution to form said precipitate and adjust said pH.

12. The method of claim 1, wherein said method comprises adding said $Al^{3+}$ ion to the crude silver nitrate solution and then adding said silver oxide to the crude silver nitrate solution to adjust said pH, whereby said precipitate is formed.

13. The method of claim 1, wherein said crude silver nitrate solution to which said $Al^{3+}$ is added is a crude silver nitrate solution obtained by dissolving silver metal in nitric acid and then adding silver oxide to the silver nitrate solution to precipitate metal hydroxides and removing said metal hydroxides from the silver nitrate solution.

14. The method of claim 11, wherein after the precipitate formed is removed from the silver nitrate solution, the method is repeated at least one additional time on the silver nitrate solution obtained.

15. The method of claim 13, wherein said crude silver nitrate solution to which said $Al^{3+}$ is added is a crude silver nitrate solution obtained by additionally adding silver oxide to said silver nitrate solution obtained after removing said metal hydroxides to further precipitate additional metal hydroxides and removing any metal hydroxides additionally precipitated from the silver nitrate solution and, optionally, repeating at least once the addition of said silver oxide to further precipitate and remove any additional metal hydroxides and removing said metal hydroxides from said silver nitrate solution.

16. The method of claim 15, wherein said method comprises simultaneously adding said $Al^{3+}$ ion and said silver oxide to the crude silver nitrate solution obtained after removing said additionally precipitated metal hydroxides from said silver nitrate solution.

17. The method of claim 1, wherein said crude silver nitrate solution to which said $Al^{3+}$ is added is a crude silver nitrate solution obtained by dissolving silver metal in nitric acid and then at least once adding silver oxide to the silver nitrate solution to precipitate metal hydroxides and removing said metal hydroxides from the silver nitrate solution and said method comprisis at least once adding said $Al^{3+}$ ion and said silver oxide to adjust said pH to about 5.5 to about 6.5 and removing the precipitate formed.

18. The method of claim 1, wherein said precipitate is the metal hydroxides of said impurities.

* * * * *